United States Patent
Hatley

(10) Patent No.: US 8,456,999 B2
(45) Date of Patent: Jun. 4, 2013

(54) METHODS AND APPARATUSES FOR ENHANCED TRANSMISSION SELECTION-CAPABLE SIMULATED TRAFFIC GENERATION

(75) Inventor: William T. Hatley, San Jose, CA (US)

(73) Assignee: Spirent Communications, Inc., Sunnyvale, CA (US)

( * ) Notice: Subject to any disclaimer, the term of this patent is extended or adjusted under 35 U.S.C. 154(b) by 0 days.

(21) Appl. No.: 13/212,978

(22) Filed: Aug. 18, 2011

(65) Prior Publication Data

US 2013/0044604 A1 Feb. 21, 2013

(51) Int. Cl.
*G01R 31/00* (2006.01)
(52) U.S. Cl.
USPC ........................................... 370/241
(58) Field of Classification Search
USPC .......................... 370/241, 474, 537
See application file for complete search history.

(56) References Cited

U.S. PATENT DOCUMENTS

| | | | |
|---|---|---|---|
| 6,252,891 B1 | 6/2001 | Perches | |
| 6,457,152 B1 | 9/2002 | Paley et al. | |
| 6,721,276 B1 | 4/2004 | Kher et al. | |
| 7,194,535 B2 | 3/2007 | Hannel et al. | |
| 7,489,706 B2 | 2/2009 | Hatley et al. | |
| 7,594,159 B2 | 9/2009 | Fujikami et al. | |
| 7,769,049 B2 * | 8/2010 | Pepper et al. | 370/474 |
| 7,933,220 B2 | 4/2011 | Hatley et al. | |
| 8,027,354 B1 * | 9/2011 | Portolani et al. | 370/431 |
| 2007/0121516 A1 | 5/2007 | Hannel et al. | |
| 2008/0239972 A1 | 10/2008 | Omar | |

OTHER PUBLICATIONS

Steven Pope et al. "End of the Road for TCP Offload" White Paper: SF-100913-TC, Solarflare Communications Inc., dated Apr. 2, 2007, pp. 1-5.
Netxen, Inc., "10Gig Chimney—Smoking the Competition" White Paper, 2006, pp. 1-3.
Netcom Systems "UltraViolet/Goldmine OC192—10GEthernet System Design" The UltraGold Design Team, Sep. 17, 2001, consisting of 330 pages.

* cited by examiner

*Primary Examiner* — Mark Rinehart
*Assistant Examiner* — Mohammad Anwar
(74) *Attorney, Agent, or Firm* — Kenta Suzue; Haynes Beffel & Wolfeld LLP

(57) ABSTRACT

Various aspects of the disclosed technology relate to the generation for test purposes of test traffic, in a manner compliant with advanced flow control.

21 Claims, 19 Drawing Sheets

| Incomplete Frame Length | Complete Frame Length |
|---|---|
| Static Ingredients ||
| Dynamic Ingredients ||

FIG. 7

| Token (Integer) | Token (Fraction) |
|---|---|
| Token Delta ||

FIG. 9

| 3 3 2 2 2 2 2 2 2 2 2 2 1 1 1 1 1 1 1 1 1 1 | | |
|---|---|---|
| 1 0 9 8 7 6 5 4 3 2 1 0 9 8 7 6 5 4 3 2 1 0 9 8 7 6 5 4 3 2 1 0 | | |
| Undefined (Ignore) | Fragment Dwords | Encoded Frame Length |
| Sequence Number [ 31:0] | | |
| Sequence Number[63:32] | | |
| Modifier Value 1 | | |
| Modifier Value 2 | | |
| Modifier Value 3 | | |
| ... | | |
| Modifier Value N | | |

FIG. 11

| 3 3 2 2 2 2 2 2 2 2 2 2 1 1 1 1 1 1 1 1 1 1 | | | | | | | | | | | | | | | | | | | | | |
|---|---|---|---|---|---|---|---|---|---|---|---|---|---|---|---|---|---|---|---|---|---|
| 1 0 9 8 7 6 5 4 3 2 1 0 9 8 7 6 5 4 3 2 1 0 9 8 7 6 5 4 3 2 1 0 | | | | | | | | | | | | | | | | | | | | | |
| Fill Type | Fill Byte | | | | Fragment Dwords | | | NMod | | | Base Content Length | | | | | | | | | | |
| Ethernet Length Delta | | | | | Ethernet Length Offset | | | Stream Index | | | | | | | | | | | | | |
| i p e | i p 4 | t c p | u d p | | Signature Offset | | | TCP/UDP Header Offset | | | IP Header Offset | | | | | | | | | | |
| e c k | i n 4 | v l n | m p l | f c s | | vfd8 Msk | | vfd7 Msk | | vfd6 Msk | | vfd5 Msk | | vfd4 Msk | | vfd3 Msk | | vfd2 Msk | | vfd1 Msk | |
| | p s h | if c | if e | | Inner FCS End | | | Inner FCS Offset | | | Inner IP Header Offset | | | | | | | | | | |
| | Offset 2 | | | | | | | Offset 1 | | | Offset 0 | | | | | | | | | | |
| | Offset 5 | | | | | | | Offset 4 | | | Offset 3 | | | | | | | | | | |
| | ... | | | | | | | | | | | | | | | | | | | | |
| | Offset N-1 | | | | | | | Offset N-2 | | | Offset N-3 | | | | | | | | | | |

FIG. 12

METHODS AND APPARATUSES FOR ENHANCED TRANSMISSION SELECTION-CAPABLE SIMULATED TRAFFIC GENERATION

BACKGROUND

1. Field of the Invention

The technology relates to network test equipment simulating a network. Separately, the technology relates to the generation of network test packets and/or the generation of parts of network test packets.

2. Description of Related Art

The technology disclosed includes a hardware and software architecture for methods and apparatuses used to test routers, switches and the like, particularly high volume infrastructure devices.

Network test equipment tests component network equipment such as routers and edge devices, by simulating network traffic from and/or to an emulated network, thereby sparing the trouble of actually setting up a real network having the complexity of the emulated network.

In architectures primarily using FPGAs for test packet generation, the Frame Sequence Table is stored in high-speed memories attached to the FPGA. In addition, a frame control structures table, base content table, and modifier parameters table are stored in additional external memories accessible by the FPGA.

In architectures which involve the CPU generating a set of packet ingredients (dynamic and static), and transmitting those to the FPGA for completion of the packets, the order in which packets are produced is still controlled by a Frame Sequence Table in the CPU memory. All the additional tables required to produce the packet ingredients are also stored in CPU memory, so that no FPGA-accessible external memory is required. Various approaches are discussed by U.S. Pat. Nos. 7,869,381; 7,872,987; 7,872,988; and 7,933,220, all of which are incorporated by reference.

Flow control is addressed by Priority Flow Control implementation detailed in IEEE Std 802.1Q and IEEE Enhanced Transmission Selection (ETS) and Congestion Notification standards. The Priority Flow Control implementation detailed in IEEE Std 802.1Q arose from an effort to control the bandwidth of Ethernet frames. In the IEEE Std 802.1Q implementation, an overall Ethernet connection has up to 8 traffic classes. Each traffic class has a specified priority. Each packet being received and transmitted (or generated and transmitted, in the case of simulated test traffic) is marked with an associated priority or traffic class of that particular packet.

If a device downstream from the device receiving and transmitting traffic (whether actual traffic or simulated test traffic) is becoming congested for one or more traffic classes, the downstream device may send a Priority Flow Control message back to the upstream transmitting device. The Priority Flow Control message indicates that the upstream transmitting device must cease transmission on one or more of the traffic classes. The Priority Flow Control message also gives a required length of time for that cessation. When the required cessation time has elapsed for any given traffic class, the transmitting device may once again begin sending packets of that traffic class. Elementary flow control is provided by the Priority Flow Control message of IEEE Std 802.1Q, in the above manner.

A newer approach to priority flow control is taken by the emerging IEEE Enhanced Transmission Selection (ETS) and Congestion Notification standards. In ETS, there are up to 8 traffic classes, and each class is assigned a percentage of the total bandwidth. The assigned bandwidths have a resolution of 1%, and the total of the assigned bandwidths of all the traffic classes is 100%.

Each traffic class can respond to Priority Flow Control messages according to IEEE Std 802.1Q, by ceasing transmission for the specified length of time required by the message. However, with ETS, the remaining traffic classes that have not ceased transmission may increase their respective bandwidths to utilize any unused bandwidth resulting from Priority Flow Control which has caused a traffic class to cease transmission. Another cause for the unused bandwidth may be due to a particular traffic class that currently lacks enough packets to fill the respective allotted bandwidth of the particular traffic class. In order to utilize the available unused bandwidth, the allocated bandwidths for the ETS flows of the remaining traffic classes are proportionally increased.

Existing architectures for generating test traffic rely on a single Frame Sequence Table define the sequence of packets to be transmitted. Such architectures are not well suited to handling the requirements of the emerging IEEE Enhanced Transmission Selection (ETS) and Congestion Notification standards.

In constructing the Frame Sequence Table, the software and/or hardware architecture takes into account the relative bandwidths of all the various flows being simulated. The Frame Sequence Table is built accordingly, so that each flow appears in the table enough times to have the correct bandwidth. When the relative bandwidths change, then the underlying bandwidth assumptions no longer apply to the appearance frequency of each flow in the table of any existing Frame Sequence Table.

In response to the change in the relative bandwidths, the architecture at a minimum re-calculates and re-writes the Frame Sequence Table so that each flow appears in the table enough times according to the new bandwidth. With a large number of flows, and/or a large number of table entries, this is a sufficiently computation-intensive process, to take a significant amount of time. The requirements of the IEEE ETS specification strictly control the amount of time allowed to respond to a requested change in bandwidth, effectively preventing a single Frame Sequence Table under these circumstances from being compliant with the IEEE ETS specification.

Beyond the considerations imposed by a single Frame Sequence Table, various existing architectures for generating test traffic are not well suited to handling the requirements of the emerging IEEE Enhanced Transmission Selection (ETS) and Congestion Notification standards, because of memory bandwidth. Each packet to be queued and transmitted is written into the memory fabric, and later read out for transmission. So the switch fabric requires an instantaneous bandwidth of at least twice that of the Ethernet link serviced by the architecture.

SUMMARY

Various aspects of the disclosed technology relate to the generation for test purposes of test traffic, in a matter compliant with advanced flow control.

BRIEF DESCRIPTION OF THE DRAWINGS

FIG. 7 is an example data structure format of an incomplete packet with the packet ingredients stored at an FPGA memory address indicated by the incompleted packet record of FIG. 6.

FIG. 9 is an example data structure format of a token bucket record.

FIG. 11 is an example data structure format of a modifier fragment of a dynamic ingredient of a packet.

FIG. 12 is an example data structure format of a control fragment of a recipe of a packet.

DETAILED DESCRIPTION

A system of packet generation is based on a high volume test system that is capable of supporting the emerging IEEE Enhanced Transmission Selection (ETS) and Congestion Notification standards. The presently described system of traffic generation is capable of supporting bandwidth sharing required by ETS.

ETS depends on transmitters storing multiple queues of packets ready for transmission. Based on the priority of each queue, and the bandwidth assigned to each queue, packets are retrieved from storage and transmitted on the link. If particular queues do not have sufficient packets to fill the bandwidth allocated to those particular queues, the remaining bandwidth is allocated proportionally to the remaining queues, allowing the remaining queues to transmit at a rate higher than the allocated rate of the remaining queues.

A high-speed switch fabric receives the packets on each queue and stores them in switch fabric memory. The stored packets are immediately accessible, such that when the time comes for transmission of the packets, the packets are immediately accessed and transmitted. Because the entire set of packets is first stored and then retrieved, the switch fabric has a sufficient overall bandwidth to accommodate at least twice the total allocated bandwidth for either writing or reading.

Stringent bandwidth requirements are addressed by the storage of dynamic and static ingredients of the packets to be transmitted on each Queue, rather than the entire packet as would be done in a switch or router. For a switch or router, this is not possible, because the entire packet is received from its original external source, then stored, and finally forwarded onto a destination. However, for generation of simulated traffic, storing the ingredients is sufficient to specify the final packet contents. The packet ingredients generally occupy significantly less memory than entire packets, and thus the bandwidth required for storage and retrieval of packets for transmission is significantly reduced.

Figure 1:
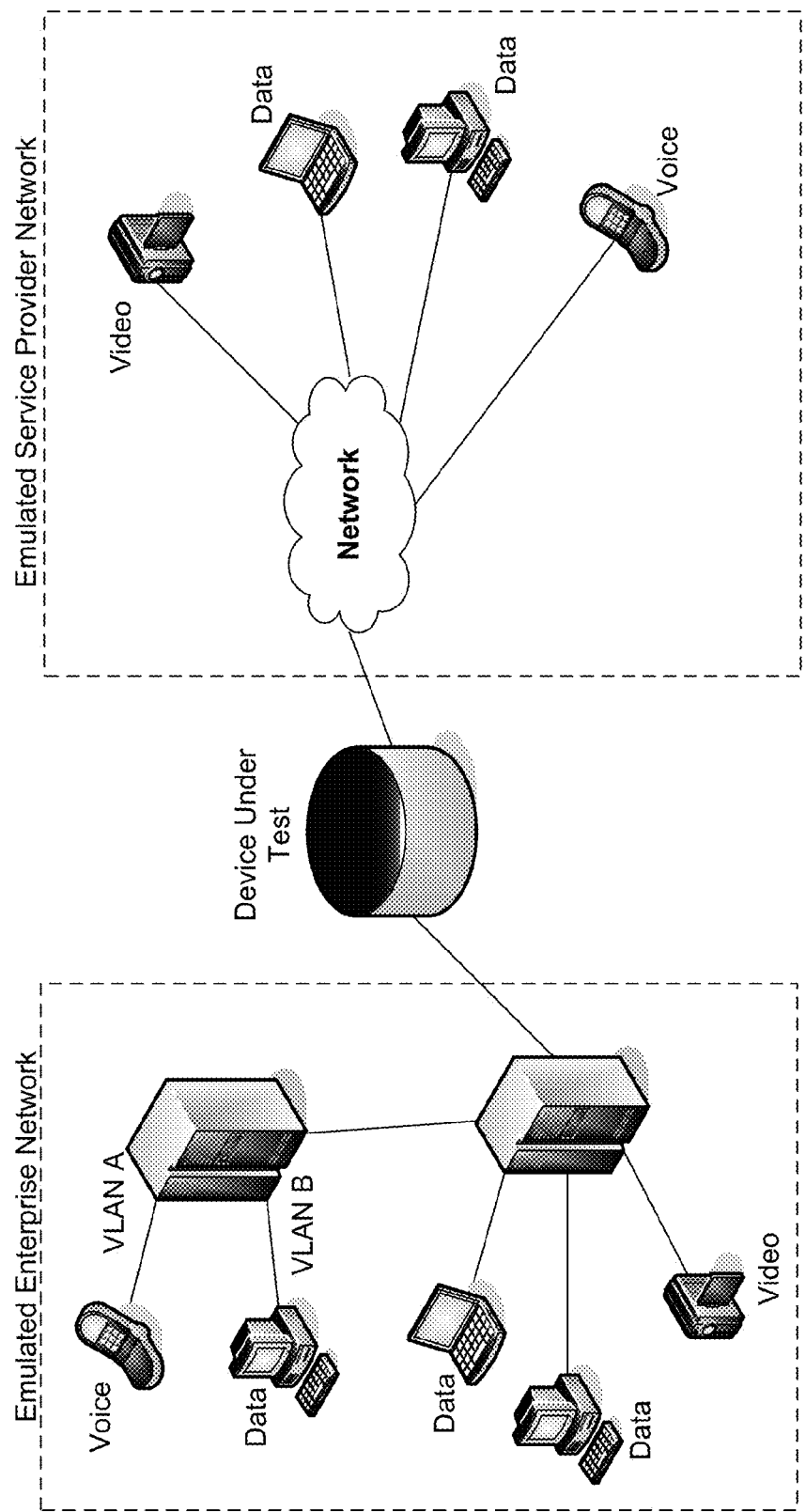
FIG. 1 is an example simplified network test topology with emulated enterprise and emulated service provider networks.

FIG. 1 is an example simplified network test topology with emulated enterprise and emulated service provider networks.

Depicted is a sample test topology for layer 2-3 switching and routing between enterprise networks and service provider networks. The device under test, such as an enterprise router or metro router, sits between the emulated networks. In this figure, the emulated enterprise network includes virtual LAN or "VLAN" segments. Traffic on the enterprise network includes voice, data and video. On the emulated service provider in our side of the DUT, sources of voice, data and video content are represented. The switching and routing devices in this scenario may support a large number of layer 2/3 technologies, including different virtual LAN encapsulations, various quality of service ("QOS") schemes, and dual-stack IPv6/IPv4 forwarding. Testing is particularly useful because each new feature or protocol increases the risk of functional or performance problems, many of which are hard to find without creating and analyzing a wide range of traffic scenarios.

In another test topology, the DUT itself includes an actual, nonemulated enterprise network or an actual, nonemulated service provider network.

Figure 2:
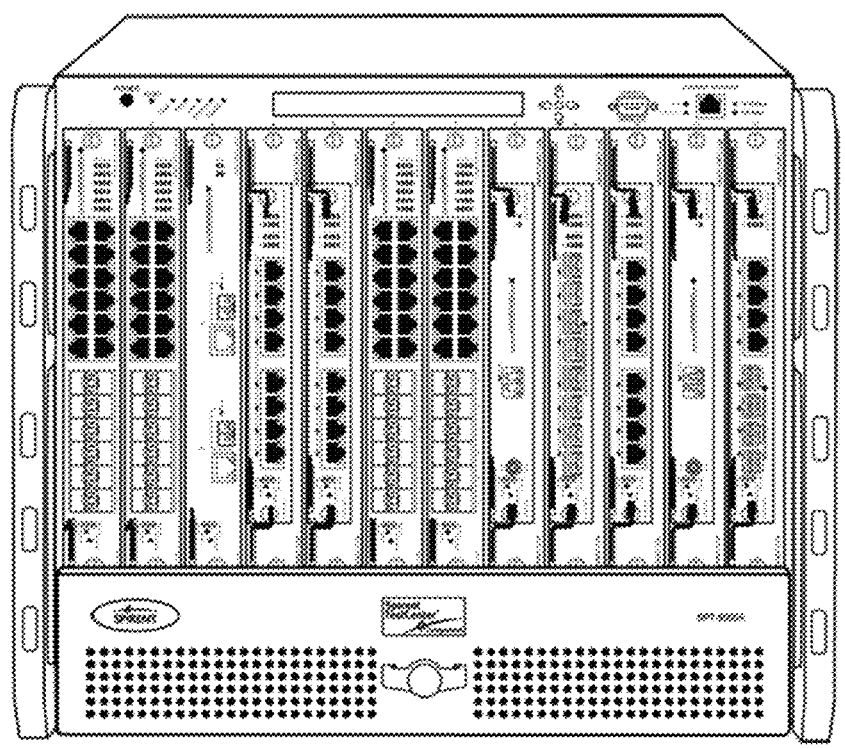
FIG. 2 is an example line drawing of a network test chassis to emulate networks, such as in FIG. 1.

FIG. 2 is an example line drawing of a network test chassis to emulate networks, such as in FIG. 1.

Shown is a line drawing of a Spirent™ SPT-9000A test chassis. The Spirent TestCenter SPT-9000A is one in a family of network test systems emulating network topologies, such as the emulated enterprise network and emulated service provider network shown in FIG. 1. Other members include the SPT-5000A, a high density network performance test system and the portable SPT-2000A/HS. Among this family, the SPT-9000A is the very high density test member typically used in the lab or a production test environment.

This test system is highly suitable, where high density Ethernet ports are desired for high-volume production and large port count testing. This test system has 12 vertical slots that can support a variety of module configurations. For instance, the chassis can be filled with up to 144 10/100/1000

Mb per second Ethernet ports. Or, it can be filled with 144 fiber or dual media gigabit Ethernet ports. It can support up to 24 10-gigabit Ethernet ports, 24 UniPHY (10 GbE/OC-192 POS) ports, 24 WAN OC-48/12/3 POS ports or 24 10 GBASE-T ports. It is anticipated that 40 GbE and 100 GbE ports also will be supported, as testing requirements rise. FIG. 2 depicts various modules supporting a mix of port types.

The Spirent TestCenter™ is one example of integrated performance analysis and service assurance systems that enable the development and deployment of next-generation networking technology, such as Internet telephony, broadband services, 3G wireless, global navigation satellite systems and network security equipment. The technology described in this disclosure applies to Spirent TestCenter™ products and generally to IP performance test systems and service verification platforms for IP-based infrastructure and services. This technology is useful in systems that test and validate performance and scalability characteristics of next-generation networking technology for voice, video and data services. Test devices, using the technology disclosed, are useful to network and telephony equipment manufacturers, semiconductor manufacturers, service providers, government departments, and enterprises to validate the capabilities and reliabilities of complex IP networks, devices and applications, such as networks for delivery of triple play packages that include voice, and video and data services. The technology disclosed is useful in testing both control plane and data plane traffic.

Figure 3:
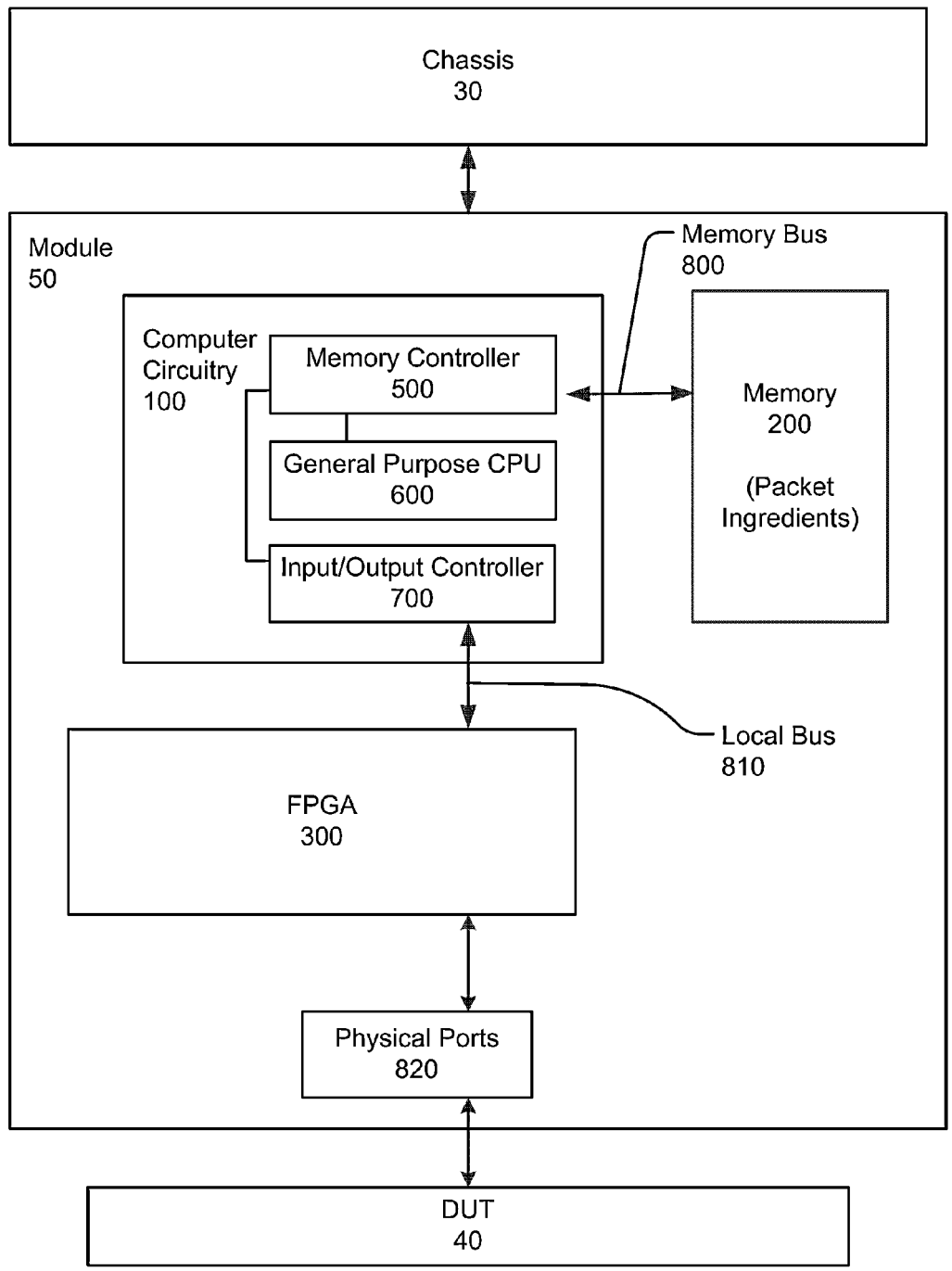
FIG. 3 is an example block diagram of a test module inserted into a chassis such as in FIG. 2.

FIG. 3 is an example block diagram of a test module inserted into a chassis such as in FIG. 2.

The test module 50 is inserted into the chassis 30, for example the Spirent™ SPT-9000A test chassis. The test module 50 emulates a network such as the enterprise network or service provide network as in FIG. 1, and communicates test packets of the emulated networks with the device under test 40. The computer circuitry 100 of the module 50 includes a general purpose microprocessor 600, a memory controller 500 of the microprocessor 600, and an input/output controller 700 of the microprocessor 600. Although the memory controller 500 is shown as an intermediate component between the microprocessor 500 and the input/output controller 700, this is merely an illustrative embodiment. The memory controller 500 is connected by a memory bus 800 to memory 200. The memory 200 stores test packet ingredients generated by the microprocessor 600. In one embodiment, about 192 megabytes of such memory is allocated per physical link, to store transmit and receive buffers, the data structures discussed below. Additional memory is required for the operating system and other applications. The FPGA 300 is connected by a local bus 810 to the input/output controller 700, and generates outgoing test packets incorporating the test packet ingredients from the memory 200. The FPGA 300 communicates incoming and outgoing test packets with the DUT 40 via the physical ports 820. Examples of physical ports 820 are consistent with the FIG. 2 discussion of 10/100/1000 Mb per second Ethernet ports, fiber or dual media gigabit Ethernet ports, 10-gigabit Ethernet ports, UniPHY (10 GbE/OC-192 POS) ports, WAN OC-48/12/3 POS ports, and 10 GBASE-T ports, and anticipated 40 GbE and 100 GbE ports.

Figure 4:
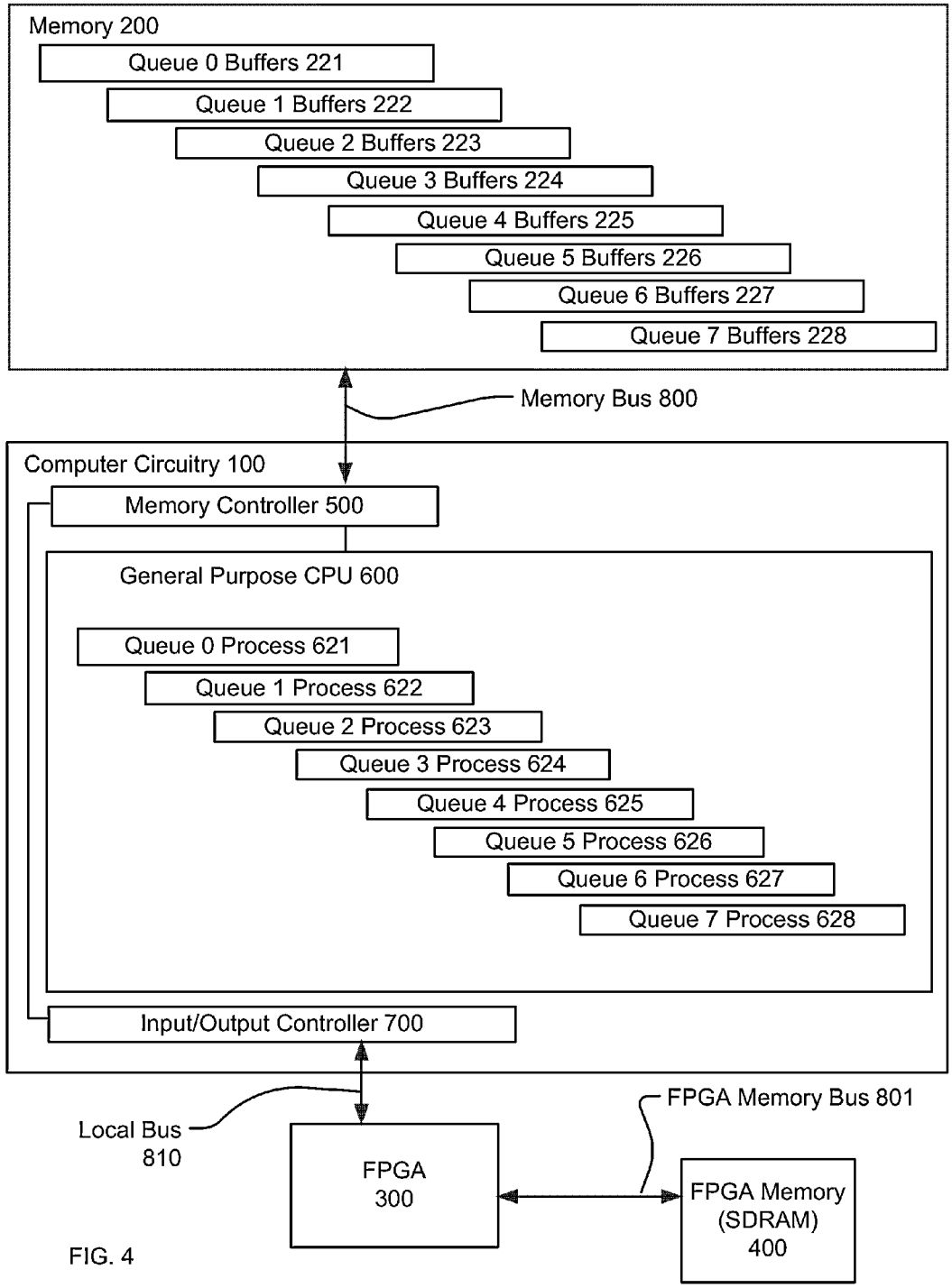
FIG. 4 is an example block diagram of part of a test module such as in FIG. 3, showing the multiple processes on the processor accessing multiple traffic class queue buffers in the processor memory accessed by the memory bus.

FIG. 4 is an example block diagram of part of a test module such as in FIG. 3, showing the multiple processes on the processor accessing multiple traffic class queue buffers in the processor memory accessed by the memory bus.

The general purpose processor 600 has multiple processes 621-628 servicing the 8 traffic class queues in the FPGA 300. The memory intensive operations of generating the test packet ingredient descriptors and the test packet ingredients are performed by the microprocessor 600.

The processing in the microprocessor 600 is optimized in a number of ways to allow the desired speed to be achieved: Data structures are optimized to minimize the amount they must be touched by the thread(s). Code is optimized to minimize the number of branches required during the processing. Advantage is taken of the SSE2 instructions of the microprocessor 600 that allow operations on 4 32-bit Dwords simultaneously.

The memory controller 500 handles memory accesses between the processor 600 and the processor memory 200. The memory controller 500 also handles memory accesses between the FPGA 300 and the processor memory 200; such accesses can transit the local bus 810 and the input/output controller 700. The processor memory 200 stores the multiple traffic class buffers 221-228. The multiple traffic class buffers 221-228 are occupied by data structures supporting the generation of outgoing test packets. Such data structure include, for each of the traffic class queues in the FPGA, the following data structures: stream index based parameters, frame header memory, base content memory, routing insertion table, and frame sequence table.

The FPGA 300 populates the multiple traffic class queues (and subsequently generates the outgoing test packets) from the test packet ingredients which are transferred by DMA from the memory 200 of the microprocessor 600. The FPGA 300 includes block RAM memory. Sufficient block RAM memory is used for FIFOs for processing the stream of incomplete test packets in traffic class queues. Alternatively, memory external to and directly connected to the FPGA 300 may be used for such processing.

Each traffic class queue has a ring buffer holding ingredient descriptors that point to the dynamic and static ingredients in the memory accessed by the memory bus. The dynamic ingredient descriptors, static ingredient descriptors, dynamic test packet ingredients, and static test packet ingredients are generated by the microprocessor 600 and stored in the memory 200 by the memory controller 500 of the microprocessor 600.

The ring buffer is an example of the frame sequence table. The ring buffer includes dynamic ingredient descriptors and static ingredient and recipe descriptors to locate in memory the test packet ingredients and recipes of the test packets for the traffic class queue that corresponds to the particular ring buffer. For example, for a first test packet in a first traffic class queue, a first ring buffer includes a first dynamic ingredient descriptor and a first static ingredient and recipe descriptor which respectively locate the dynamic ingredient and static ingredient and recipe of a first incomplete packet to enter the first traffic class queue. As another example, for a second test packet in the same traffic class queue, the generator ring buffer includes a second dynamic ingredient descriptor and a second static ingredient and recipe descriptor which respectively locate the dynamic ingredient and static ingredient and recipe of a second incomplete packet to enter the second traffic class queue. Contiguous memory reads are faster. In one embodiment, the static ingredient and recipe are stored together to reduce the number of reads. Another embodiment which separates the static ingredient and the recipe, requires multiple reads instead of one read.

In another embodiment the incomplete packets are generated by logic within the FPGA. This is in contrast with FIG. 4 showing the incomplete packets being generated by the general purpose processor, and then transferred to the traffic class queues of the FPGA. In yet another embodiment, incomplete packets are generated by both the general purpose processor (from which the incomplete packets are transferred to the FPGA) and the logic within the FPGA. The generation of incomplete packets in the FPGA provides another mechanism for filling one or more of the traffic class queues.

The local bus, such as a PCI-Express bus, has a finite bandwidth. If the general purpose processor generates all of the incomplete packets, it is possible that the local bus cannot supply all of the traffic class queues with the incomplete packets rapidly enough to meet the bandwidth requirements on the link under test. Such a circumstance is more likely if all of the test packets being managed in all of the traffic class queues are minimum-sized packets.

In an embodiment generating at least some of the incomplete packets on the FPGA, the incomplete packets generated by the FPGA share the same format as the incomplete packets generated by the CPU and read from the CPU memory. The FPGA is capable of generating a smaller number of streams than the CPU, and has the capability of generating a more limited set of modifiers than the CPU. Such restrictions result from the relatively limited memory within the FPGA for storing the information to develop the packets and their associated modifier components. However, the FPGA logic is fast enough that the FPGA can generate incomplete packets at line rate if required. The combination of incomplete packets queued from the FPGA and those queued from the CPU provide the capability of filling the link under test with line rate packets, some of which are relatively simple (generated by the FPGA) and others of which have full modifier capabilities (generated by the CPU).

Figure 5:
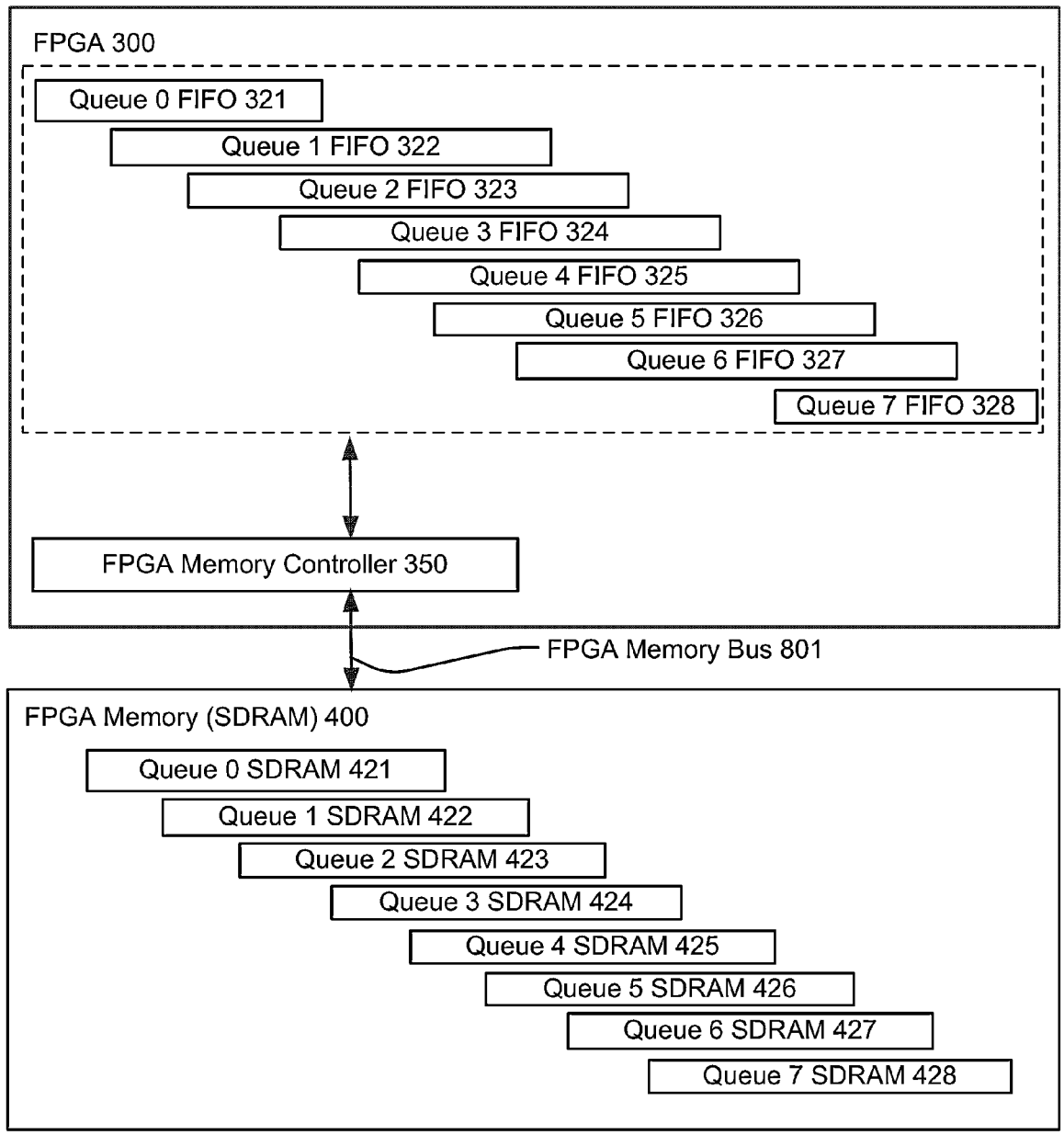
FIG. 5 is an example block diagram of part of a test module such as in FIG. 3, showing an FPGA with multiple traffic class queues of incomplete packet records, and FPGA memory storing the incomplete packets at FPGA memory addresses indicated in the queued incomplete packets records of the FPGA.

FIG. 5 is an example block diagram of part of a test module such as in FIG. 3, showing an FPGA with multiple traffic class queues of incomplete packet records, and FPGA memory storing the incomplete packets at FPGA memory addresses indicated in the queued incomplete packets records of the FPGA. The ring buffer or frame sequence table of each traffic class queue assists the location and reading of the dynamic ingredient and static ingredient and recipe of each packet as described above. As the dynamic ingredient and static ingredient and recipe of each packet are read into the FPGA 300, the eight traffic class queues 321-328 become filled with the records of incomplete packets. As the eight traffic class queues 321-328 become filled with the records of incomplete packets, the actual incomplete packets are stored in FPGA memory 400 at FPGA memory addresses indicated by the records of incomplete packets in the FPGA 300. Read requests are issued on the local bus as the queues to keep each queue occupied.

Figure 6:
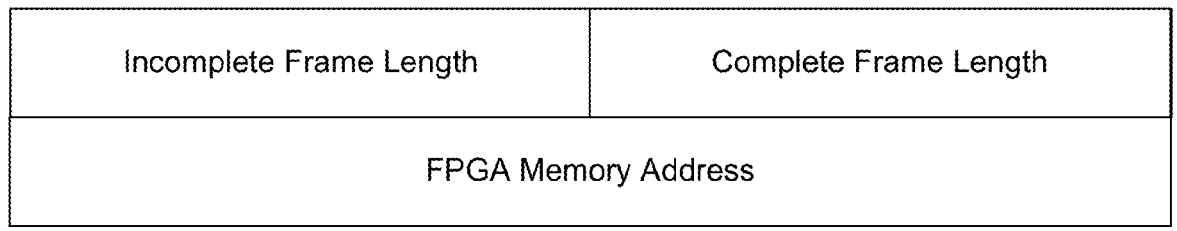
FIG. 6 is an example data structure format of an incomplete packet record that is stored by the FPGA in multiple traffic class queues.

FIG. 6 is an example data structure format of an incomplete packet record that is stored by the FPGA in multiple traffic class queues. The record includes the incomplete frame/packet length, the complete frame/packet length, and the FPGA memory address at which the actual incomplete packet is stored.

FIG. 7 is an example data structure format of an incomplete packet with the packet ingredients stored at an FPGA memory address indicated by the incompleted packet record of FIG. 6. This data structure includes the incomplete frame/packet length, the complete frame/packet length, the static ingredients, and the dynamic ingredients.

There are a number of ways to control the bandwidth of each queue. One simple mechanism is to apply token bucket metering for each queue. Token buckets allow independent control of the rates at which packets are read from each queue. The rates are controlled by a single variable in some embodiments.

Figure 8:
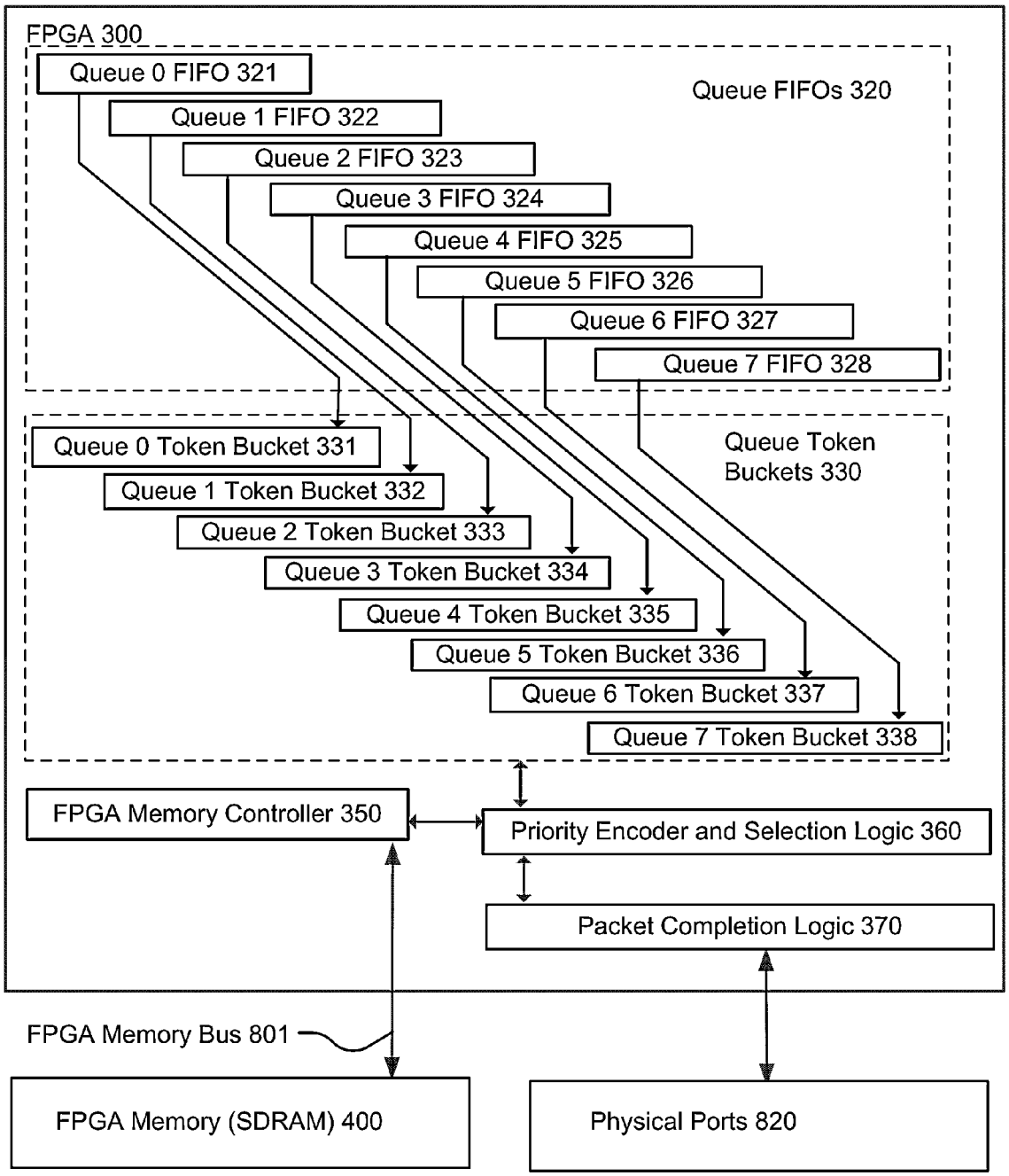
FIG. 8 is an example block diagram of part of a test module such as in FIG. 3, showing an FPGA with multiple traffic class queues of incomplete packet records, and multiple token buckets that help determine the next traffic class queue in the sequence of generated packets.

FIG. 8 is an example block diagram of part of a test module such as in FIG. 3, showing an FPGA with multiple traffic class queues of incomplete packet records, and multiple token buckets that help determine the next traffic class queue in the sequence of generated packets.

Figure 9:
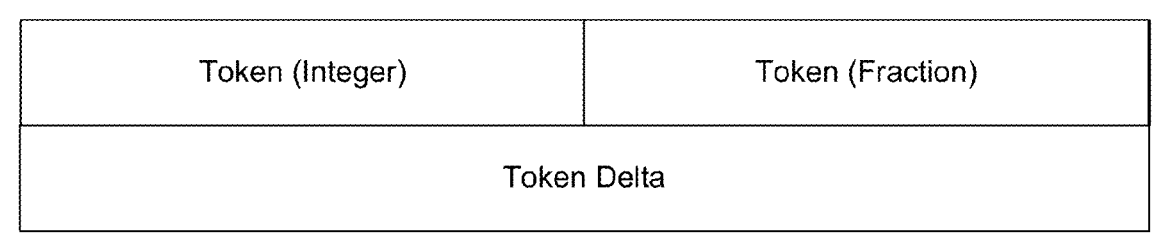

FIG. 9 is an example data structure format of a token bucket record. The data structure includes an integer part of the token, a fractional part of the token, and the token delta.

Each traffic class queue has a token bucket data structure. Each token bucket has a token delta that is determined by the bandwidth allocated to each traffic class queue. At a determined periodic interval, the integer and fractional parts of the token in each token bucket are updated. The token delta is added to the integer and fractional parts of the token. When the integer part of the token is greater than or equal to the packet length of the next entry in the associated traffic class queue, that traffic class queue is ready for transmission.

A priority encoder chooses one of the eight possible traffic class queues. The next transmitted packet is from the chosen traffic class queue. The choice of the next traffic class is based on the relative priorities given to all traffic class queues. The traffic class queue chosen next, is the traffic class queue which is ready for transmission, and has the highest priority. The next transmitted packet is from the chosen traffic class queue. The token bucket associated with the chosen traffic class queue is decremented by the packet length (including the preamble and minimum interpacket gap). The incomplete packet is read from FPGA memory at the FPGA address indicated by the incomplete packet record in the chosen traffic class queue. The incomplete packet is processed into a complete packet by the packet completion logic.

The packet completion logic expands the static and dynamic ingredients of the packet to its specified length. The packet completion logic modifies components specified by the dynamic ingredients. Finally, the packet completion logic sends the completed packet out the physical port.

The amount of data required for the packet ingredients is much less than the length of the complete packet if the packet is more than minimum size. For example, in order to fully specify a packet of simple IPV4 content, a total data length of about 64 bytes of dynamic and static ingredients is required. If the actual packet length is 640 bytes, the bandwidth required in the memory is one tenth that required for a full switch.

The bandwidth associated with each queue is controlled by the token delta for the associated token bucket. The token delta is written by the processor to make an instantaneous change to the allocated bandwidth of the traffic class corresponding to the token bucket. If the bandwidth for one (or more) queues is lowered by the token delta, the processor can also write a token delta representing a larger bandwidth into other traffic class queues. Effectively, the other traffic class queues have increased their bandwidths to take up the otherwise unutilized bandwidth of the traffic class queue with the lowered bandwidth.

If a priority flow control message is received from the link peer, the token delta for the associated traffic class queue may be set to zero by the FPGA for the length of time specified in the priority flow control message. At the same time, the FPGA may proportionally increase the bandwidths of all the remaining queues, so that the total bandwidth is still 100%. When the priority flow control time has expired, the altered token deltas are returned to their originally provisioned values.

The remainder of the description is focused on the packet ingredients, their associated data structures, and associated processes of processing the packet ingredients.

The following describes the doorbell register. The microprocessor 600 writes to give the packet ingredient and recipe descriptors to the FPGA 300. The microprocessor 600 reads to determine how many descriptors there are room for. Read operation is slow in an embodiment where the microprocessor 600 stalls until results are available, degrading performance. In another embodiment, the FPGA will periodically post this information to the cache of the microprocessor 600, so the read does not stall the microprocessor 600.

The dynamic ingredients and the static ingredients are transferred by direct memory access (DMA) from the memory 200 accessed by the memory controller 500 and the microprocessor 600. This DMA access reduces the load on the microprocessor 600 and associated latency. The memory 200 stores the packet ingredients and recipe and the packet ingredient and recipe descriptors, which were both generated by the microprocessor 600.

Each packet is read by two local bus reads from memory 200. The first read is a modifier fragment included in the dynamic ingredient, which contains information that is dynamic for each packet. The modifier fragment is individually calculated by the microprocessor for each outgoing packet. The second read is a combo fragment, which contains two sets of static information, the base content and the control fragment, generally neither touched nor modified by the processor for each outgoing packet.

The control fragment contains all of the various flags and offsets required to generate the packet, including where to insert the contents of the modifier fragment.

The base content contains the first portion of the packet, up to the first byte of fill. The base content is modified according to the modifier fragment. The base content is placed immediately after the control fragment in memory 200, so both are read using a single descriptor.

To meet the exacting timing requirements of test equipment, the dispatch times of packets are precisely controlled and measured. The dispatch time of the first packet is controlled by comparing the running timestamp clock to a specified time in the future. When those are equal, transmission of the first packet begins. This allows specification of the initial packet's dispatch time to within a few ticks of the 100 MHz timestamp clock. Remaining packets are then dispatched in response to the token buckets. In a scenario where Frame A is dispatched, and then Frame B is dispatched, the interframe gap between the frames is computed as the time when the Frame B should begin, minus the time when Frame A began, and minus the lengths of Frame A and the preamble of Frame A.

As each packet is prepared for transmission, the FPGA measures the time at which either the first byte or the last byte of the packet is transmitted, and inserts that time into the outgoing packet. Although the FPGA measures this time before the packet is actually transmitted, a fixed amount of time elapses between the point at which the timestamp is measured, and the point at which the packet actually is inserted onto the link, and the timestamp scheme compensates for this fixed amount of time, either in the timestamp itself or in processing subsequent to receipt of the packet.

Figure 10:
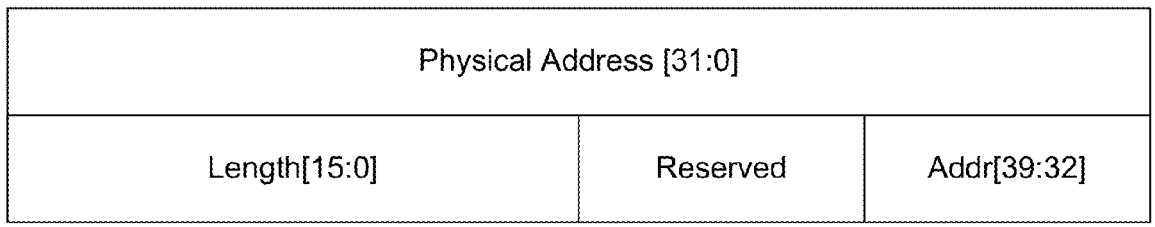
FIG. 10 is an example data structure format of a packet ingredient descriptor.

FIG. 10 is an example data structure format of a packet ingredient descriptor. This descriptor provides the information needed by the FPGA to access an ingredient in the memory using the memory bus. The descriptor contains a physical address within the memory at which the ingredient is stored. It also contains the length of the ingredient in bytes. This is sufficient information to allow the memory bus to retrieve the ingredient in question. In this implementation, the descriptor is 8 bytes in length; other implementations can adjust the length of the descriptor such that the descriptor has sufficient data to specify a physical address within the memory at which the ingredient is stored.

The ring buffer controls are implemented in PCI-E BAR register space. The ring buffer registers contain the physical address of the start of the ring buffer. The length is the total number of descriptor positions in the ring buffer, a power of 2.

FIG. 11 is an example data structure format of a modifier fragment of a dynamic ingredient of a packet. The dynamic modifier fragment contains information that changes each time a specific packet is transmitted. The processor must generate each modifier fragment based on information stored in the modifier parameter area of its memory for this packet. In this implementation, the modifier fragment contains the following:

a) The length of the modifier fragment in 32-bit Dwords. This permits the FPGA to know when it has completed reading the fragment, which is of variable length.

b) An encoded length in bytes of the packet to be transmitted. In some cases this may be fixed. In other cases, the length is computed by the FPGA as an incrementing or decrementing length, or even as a uniformly distributed random length.

c) A sequence number computed for this specific packet. The sequence number is used by the receiving test equipment to verify whether any received packets have been dropped or delivered out of sequence.

d) From 0 to N 32-bit modifier values calculated by the processor, to be inserted into the outgoing packet. These modifier values are placed into the packet at offsets from the start of packet that are indicated in the Control Fragment described later. As an example of the use of such modifiers, one might be positioned to replace the Destination IP Address in the IP Header which is part of the Packet. This allows a single Packet recipe to effectively generate large numbers of IP flows. In addition, there are from 0 to N 32-bit values that can be read from a table in memory to overlay additional locations in the outgoing packet. These values are precomputed by the CPU to be readily inserted into the packet by the FPGA, without requiring additional computation by the FPGA. Accordingly, the modifier fragment of this embodiment is processed quickly and easily than unlike prior releases of TestCenter, which required by the FPGA to calculate the actual modifier values inserted by the FPGA based on the entries from the modifier parameters table.

By splitting the packet ingredients into dynamic and static parts, only the dynamic part is required to be generated for varying packets of a particular packet stream.

Modifications are also made to the packet to handle IPV4 checksums, adjusting the length fields in the various headers to account for non fixed-length packets, and computing and inserting TCP or UDP checksums if required. Because this is a test instrument, provision is made to allow the various checksums to be inserted with errors if desired.

Once all the fill pattern has been inserted, and all modification are made to the packet, a Spirent signature field is inserted, containing stream identification, sequence number, very accurate timestamp, and other fields required to make detection of the signature field robust, and also to allow the TCP/UDP checksum to be correct without having to read the entire packet first.

FIG. 12 is an example data structure format of a control fragment of a recipe of a packet.

The control fragment defines the various items that the FPGA requires in order to build each outgoing packet. In this implementation, the control fragment contains the following information:

a) A fill type, to indicate one of several patterns that the FPGA will use to fill the contents of the packet after the base content has been exhausted, and up to the beginning of the signature field. For example, the remaining bytes may be filled with a constant byte, or with an incrementing or decrementing byte, or with a pseudo-random bit pattern.

b) A fill byte; in case of a constant byte fill pattern, this is the byte to be inserted. In case of an incrementing or decrementing pattern, this is the initial byte inserted. In case of a pseudo-random bit pattern, this parameter is ignored.

c) The length of the control fragment in 32-bit dwords. This is used by the FPGA logic to determine when it has read the complete control fragment. Data immediately following the control fragment is (in this implementation) the base content of the packet.

d) The length of the base content in bytes. The FPGA logic uses this to determine the amount of additional information read after the control fragment. This base content contains such fields as MAC headers, IP Headers, etc. In other words, the first portion of the outgoing Packet. The transmitted packet contains this base content first, followed by the fill pattern, followed by a signature field that contains sequence and timestamp information.

e) Ethernet Length data is used for some packet protocols to set the Ethernet Length in the outgoing Packet. This field is used along with the Packet Length information from the Modifier fragment to determine the actual length to be inserted.

f) Ethernet Length offset is used to indicate the offset from the start of packet at which the Ethernet Length is to be inserted.

g) Stream Index—this is a unique flow identifier for this specific packet, and is inserted into the signature field so that the receiving test equipment can correlate statistics for this specific flow.

h) The signature offset indicates the number of bytes prior to the end of packet at which the signature is to be inserted.

i) The TCP/UDP Header offset indicates the offset from the start of packet at which a TCP header is present in the packet. The FPGA logic requires this in order to be able to compute a TCP or UDP checksum.

j) IP Header offset. The FPGA requires this information to allow it to adjust the length information in the header. In addition, if the packet is IPV4, this offset indicates where to begin computing the IPV4 Header checksum.

k) Inner IP Header Offset. For some protocols, an IP packet is "tunneled" inside of an outer IP Packet. In this case, the Inner offset allows the FPGA logic to adjust the length and the IP Header checksum for the second header.

l) Inner FCS Offset and Inner FCS End. If multiple encapsulations are present, for some protocols in which complete packets are encapsulated within a larger packet, there is an inner FCS that must be computed to make the packet valid. The Offset indicates the offset from the start of packet at which the inner FCS is to be computed. The Inner FCS End indicates the offset from the end of packet at which that inner FCS is to be inserted.

m) Various one-bit flags, used by the FPGA logic to indicate specific functions. In this implementation, the following flags are included: UDP or TCP to indicate the presence of either protocol in the outgoing packet. IPV4 to indicate that the outer IP header is IPV4 (or IPV6). IPError to indicate that the IPV4 header checksum should be errored. FCS to indicate that the FCS inserted at the end of the packet should be errored. MPLS and VLAN to indicate whether those protocols are present in the packet. Inner IPV4 to indicate the flavor of an inner IP header if present. ECK to indicate that the TCP or UDP checksum in the outgoing packet should be errored. PSH to indicate that a TCP or UDP checksum should be applied at the inner (or outer) IP Header. IFC to indicate that the inner FCS should be computed, and IFE to indicate that the inner FCS should be errored.

n) 0 to N offsets used to indicate where the corresponding Modifiers in the Modifier Fragment should be inserted in the outgoing packet. In earlier versions of TestCenter, these offsets originated from the modifier parameters table, rather than from the frame control structures table. By moving these offsets to the frame control structures table, processing speed is greatly increased.

o) 8 Mask fields, used to indicate the number of bits to be masked off in the first 8 modifiers. This allows these modifiers to be placed at locations that are not multiples of 8 bits offset from the start of packet.

The control fragment's packet ingredients are interpreted by the FPGA to fill out the test packet. In this way, a balance is met between reducing the overhead on the microprocessor so that the microprocessor is not required to generate the complete test packet as with a network interface card, yet sufficient packet ingredients are transferred to the FPGA to eliminate or significantly reduce the amount of fast memory required to be directly connected to the FPGA.

Another static ingredient of a packet is the base content, which specifies the first N bytes of the packet to be transmitted, where N is specified by a field in the Frame Control Structure, such up to 1024 bytes. After the base content has been copied into the packet, the fill pattern is inserted out to the last byte prior to the Spirent signature field.

Figure 13:
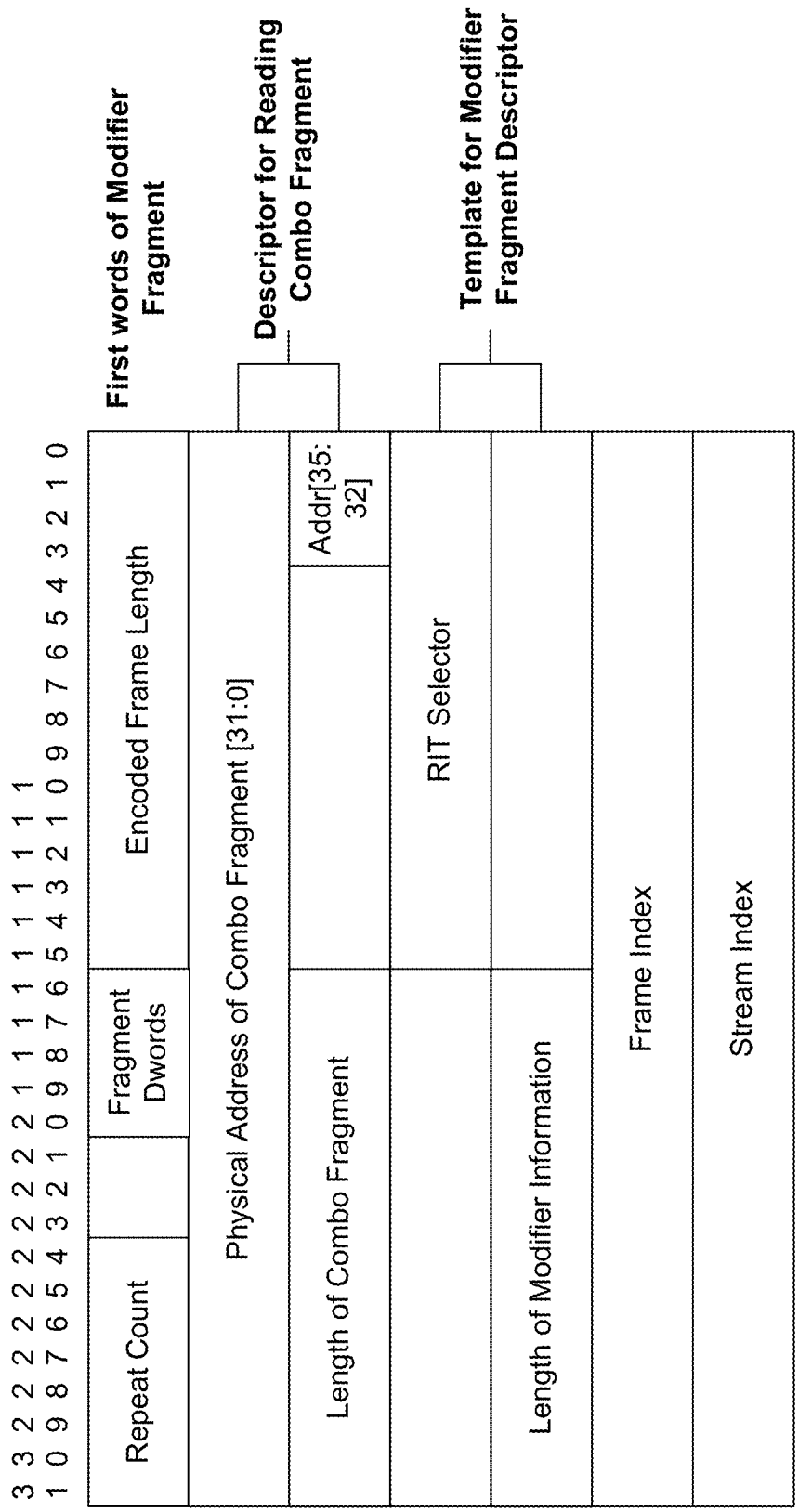
FIG. 13 is an example data structure format of a frame sequence table.

FIG. 13 is an example data structure format of a frame sequence table. The frame sequence table is accessed by the processor to determine the next packet to be generated. In this implementation, each entry in the frame sequence table is 32 bytes. The fields within are used as follows:

a) The first 8 bytes are identical to the first 8 bytes of the Modifier fragment, and the processor simply needs to copy that into the modifier fragment it builds for each outgoing packet.

b) The second 8 bytes are the descriptor that the FPGA needs to use to read the combination of the control fragment and the base content. The processor simply copies this value to the ring buffer without modification.

c) The 3rd 8-byte value is a template for generating the descriptor that the FPGA needs to used to read the modifier fragment. The length value is in place, and the processor needs to insert the physical address of the modifier fragment which it builds for each outgoing packet.

d) An RIT selector is used to access modifier information in processor memory that consists of a fixed table. If present, values will be read from this table and inserted into the outgoing Modifier Fragment.

e) Packet Index—this index permits the CPU to locate the combination of control fragment and base content within memory. This is only used at setup time, and is not used while the packets are being transmitted.

f) Stream Index. This index permits the processor to access the Modifier Parameters for this packet, in order to compute the dynamic portions of the Modifier Fragment each time a packet from this stream is generated.

The SSE2 instructions cut down branches. The SSE2 instructions allow the modifier fields to be computed up to 4 at a time, significantly increasing the speed with which the CPU can produce the modifier fragment. Non-SSE2 instructions may be used with some speed penalty.

FIGS. 14-18 are additional examples of various embodiments of the technology, illustrating that variations of integration of various components fall within the scope of the technology. Other non-illustrated variations also fall within the scope of the technology, such as components only partly integrated with another component.

Figure 14:
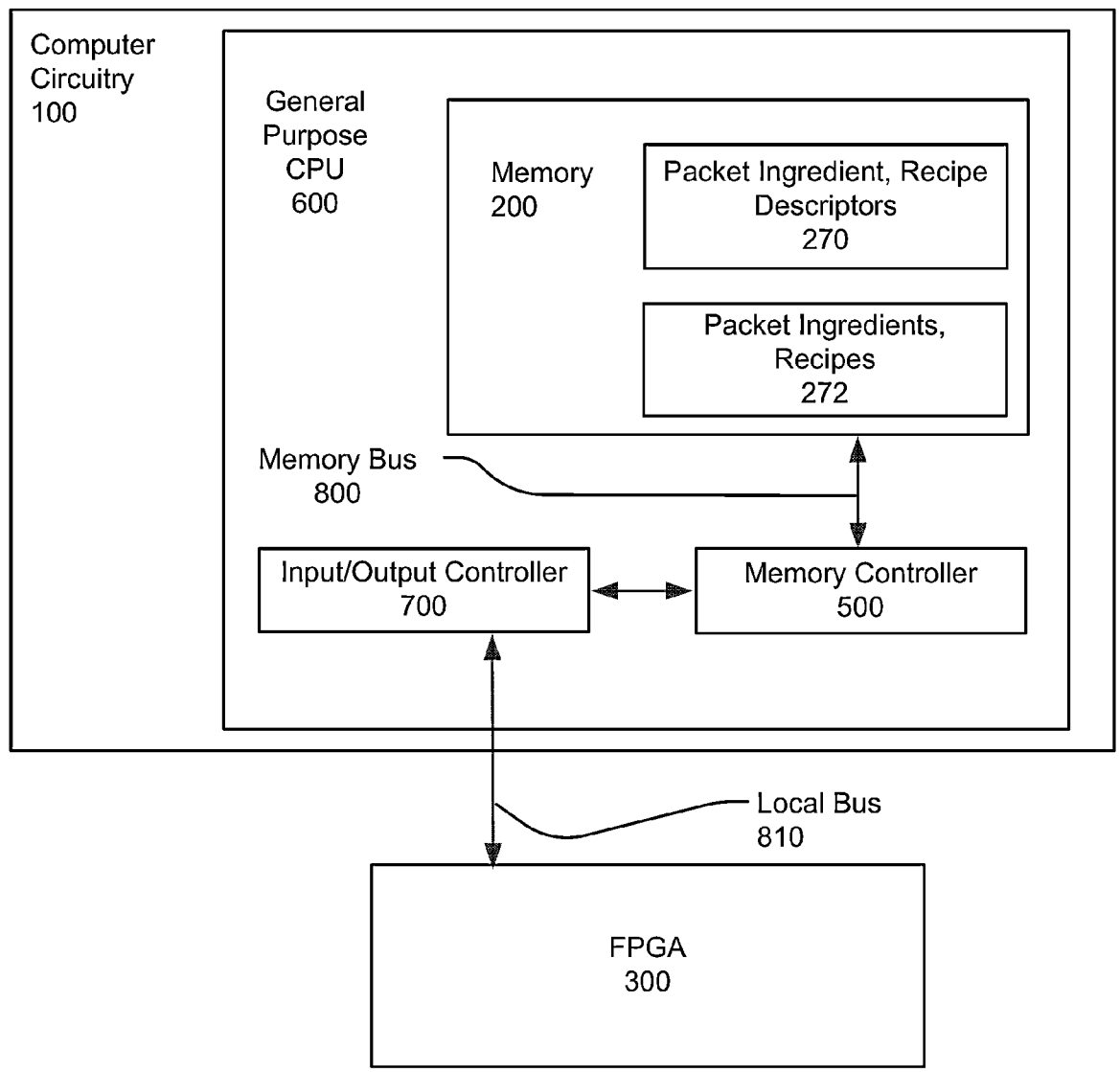
FIG. 14 is an example block diagram of part of a test module such as in FIG. 3, showing an example of computer circuitry which integrates into the CPU, the memory controller, the memory accessed by the memory bus, and input-output controller.

FIG. 14 is an example block diagram of part of a test module such as in FIG. 3, showing an example of computer circuitry which integrates into the CPU, the memory controller, the memory accessed by the memory bus, and input-output controller.

Figure 15:
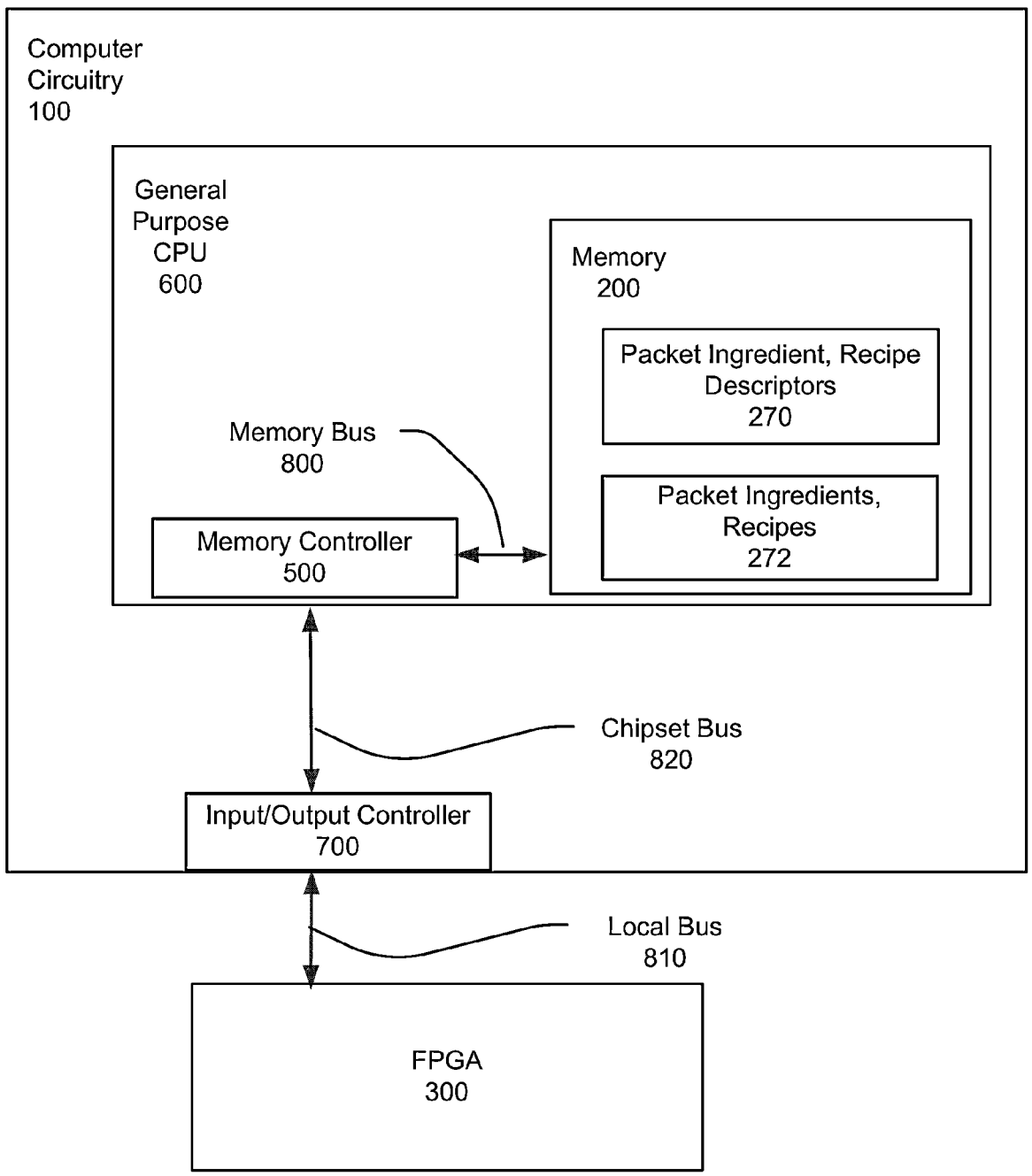
FIG. 15 is another example block diagram of part of a test module such as in FIG. 3, showing an example of computer circuitry which integrates into the CPU, the memory controller, and the memory accessed by the memory bus.

FIG. 15 is another example block diagram of part of a test module such as in FIG. 3, showing an example of computer circuitry which integrates into the CPU, the memory controller, and the memory accessed by the memory bus.

Figure 16:
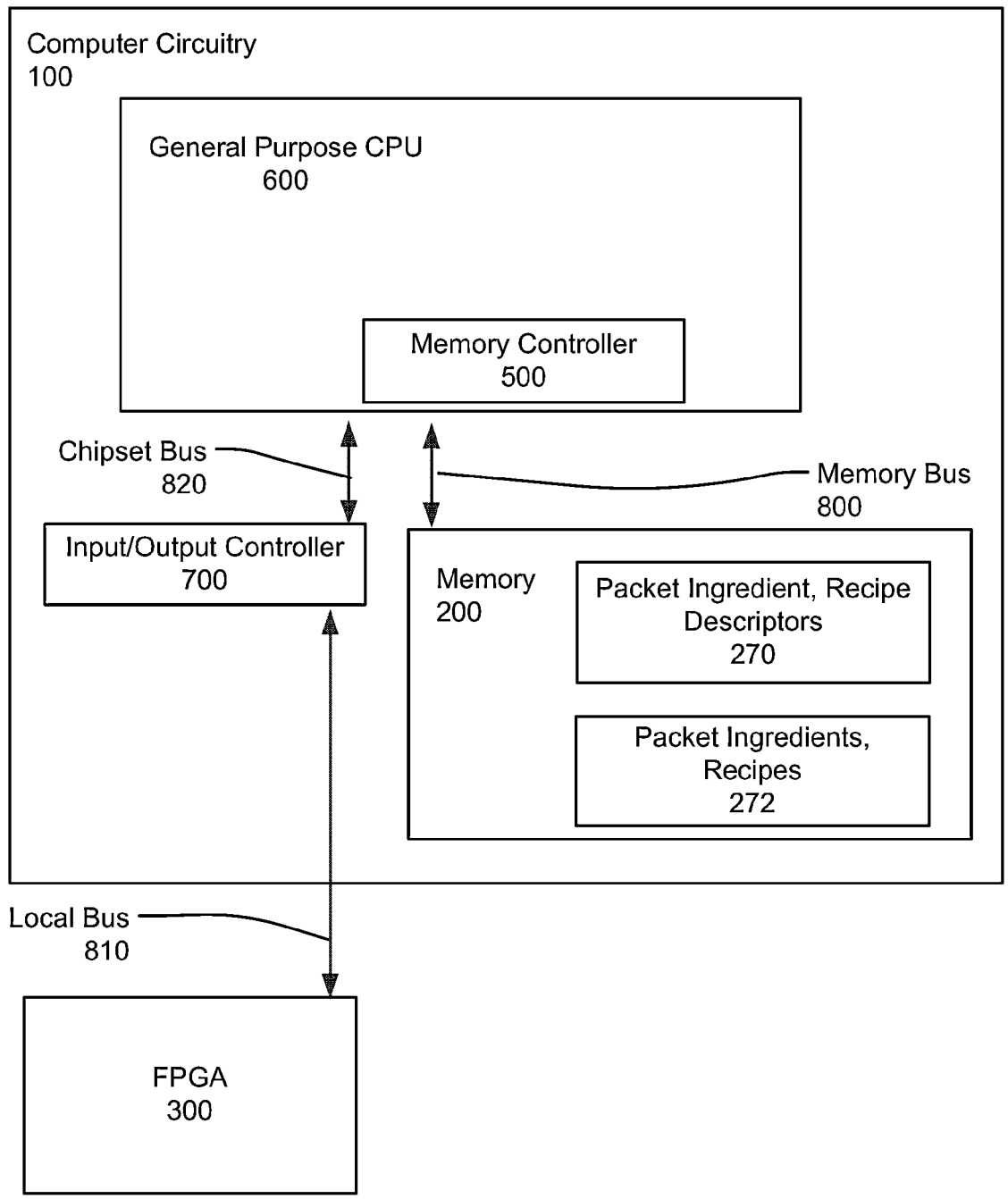
FIG. 16 is an example block diagram of part of a test module such as in FIG. 3, showing an example of computer circuitry which integrates into the CPU, the memory controller.

FIG. 16 is an example block diagram of part of a test module such as in FIG. 3, showing an example of computer circuitry which integrates into the CPU, the memory controller.

Figure 17:
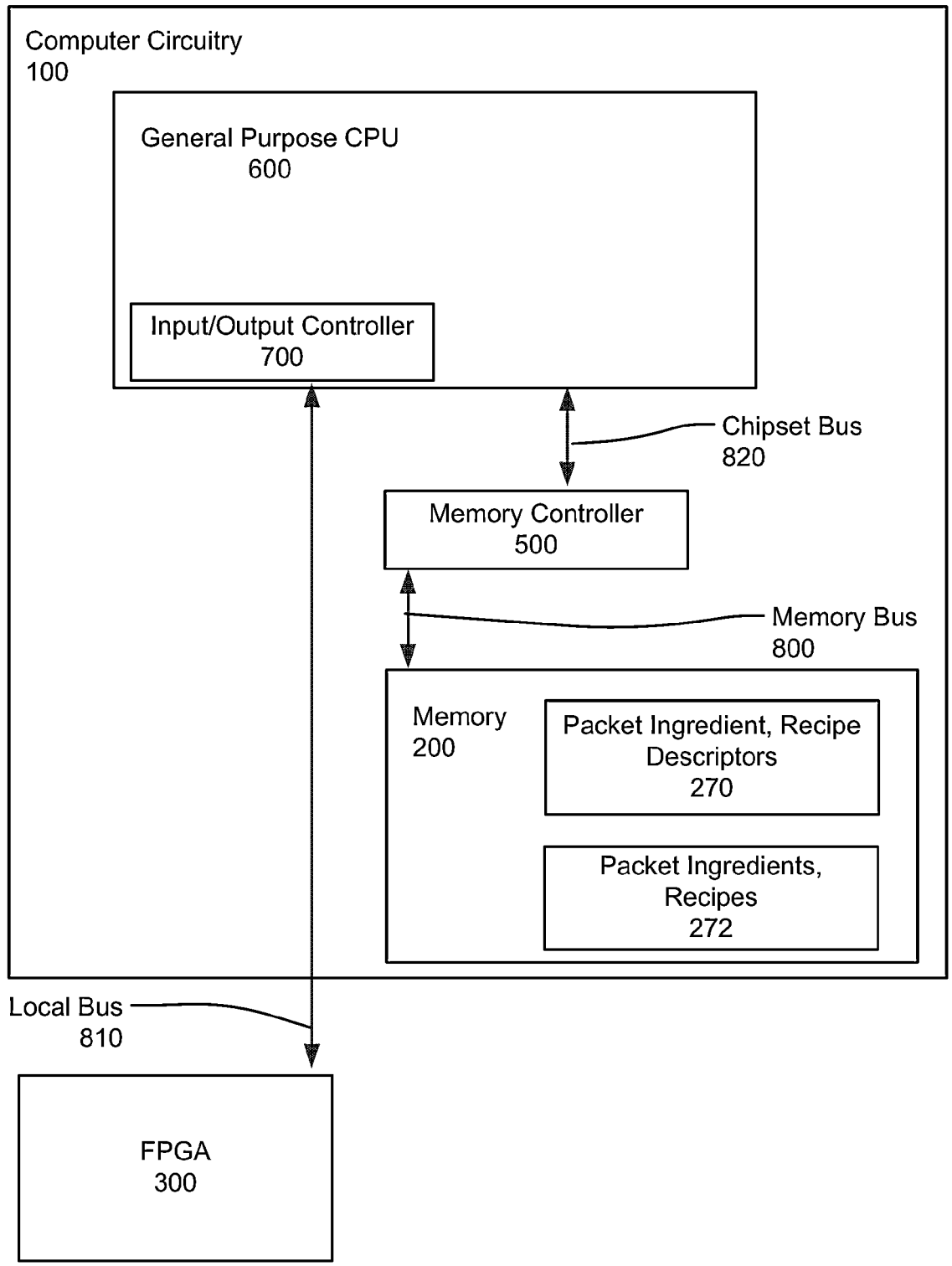
FIG. 17 is an example block diagram of part of a test module such as in FIG. 3, showing an example of computer circuitry which integrates into the CPU, the input-output controller.

FIG. 17 is an example block diagram of part of a test module such as in FIG. 3, showing an example of computer circuitry which integrates into the CPU, the input-output controller.

Figure 18:
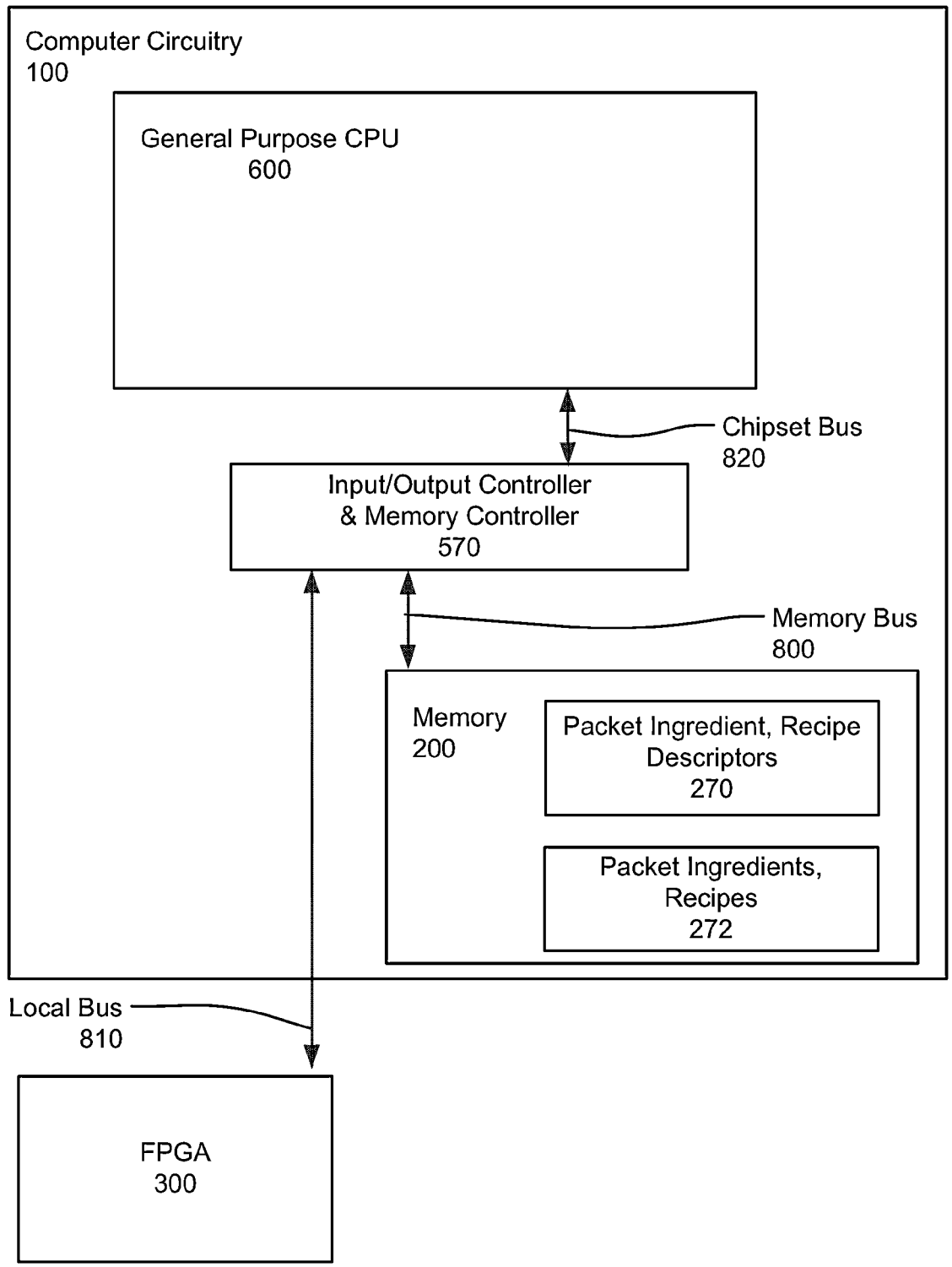
FIG. 18 is an example block diagram of part of a test module such as in FIG. 3, showing an example of computer circuitry which integrates the input-output controller and the memory controller.

FIG. 18 is an example block diagram of part of a test module such as in FIG. 3, showing an example of computer circuitry which integrates the input-output controller and the memory controller.

Figure 19:
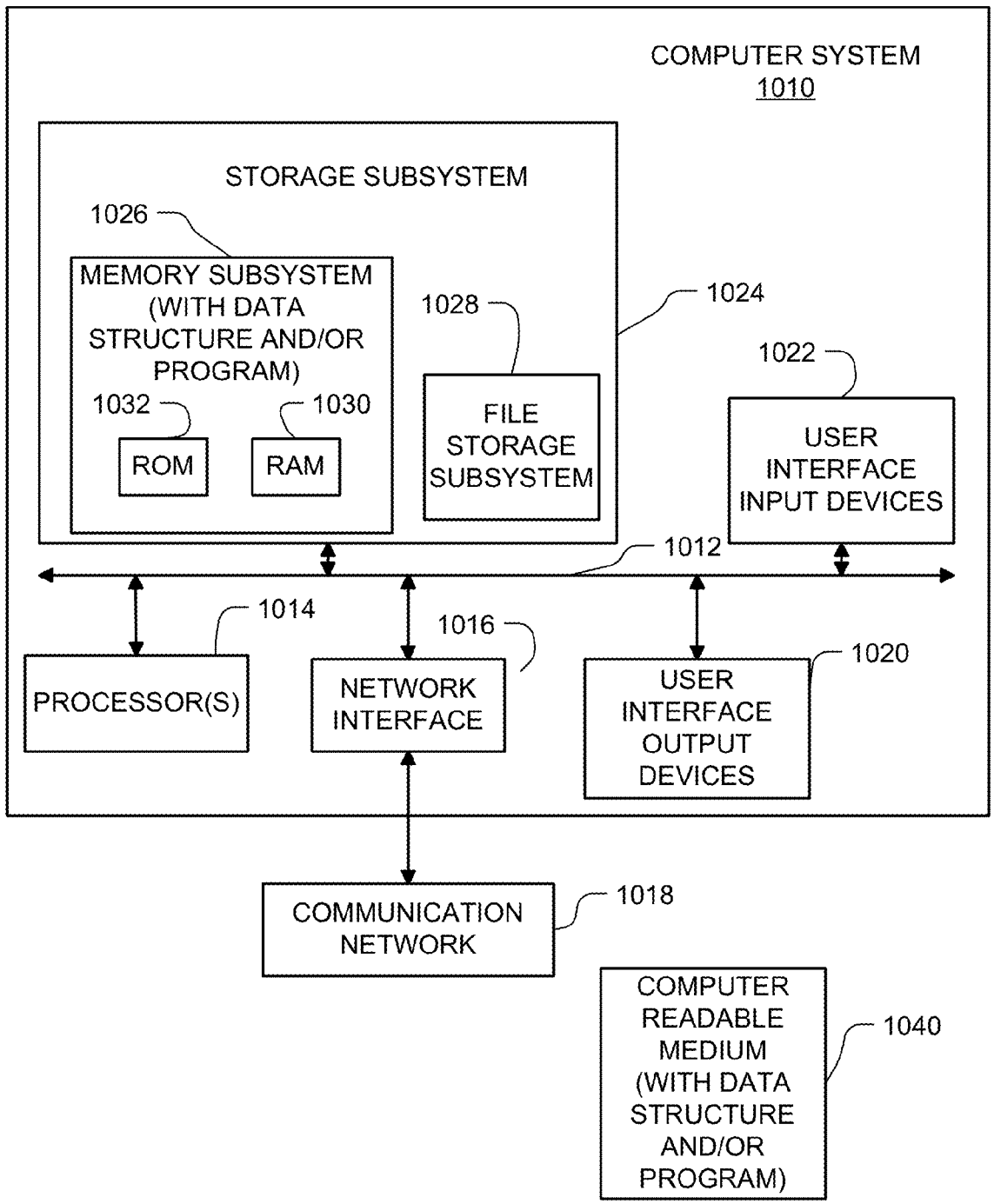
FIG. 19 is an example block diagram of a computer system, such as a computer system with a memory storing a program implementing the described technology or a data structure implementing the described technology.

FIG. 19 is an example block diagram of a computer system, such as a computer system with a memory storing a program implementing the described technology or a data structure implementing the described technology.

Shown is a simplified block diagram of a computer system 1010 suitable for use with embodiments of the technology. Computer system 1010 typically includes at least one processor 1014 which communicates with a number of peripheral devices via bus subsystem 1012. These peripheral devices may include a storage subsystem 1024, comprising a memory subsystem 1026 and a file storage subsystem 1028, user interface input devices 1022, user interface output devices 1020, and a network interface subsystem 1016. The input and output devices allow user interaction with computer system 1010. Network interface subsystem 1016 provides an interface to outside networks, including an interface to communication network 1018, and is coupled via communication network 1018 to corresponding interface devices in other computer systems. Communication network 1018 may comprise many interconnected computer systems and communication links. These communication links may be wireline links, optical links, wireless links, or any other mechanisms for communication of information. While in one embodiment, communication network 1018 is the Internet, in other embodiments, communication network 1018 may be any suitable computer network.

User interface input devices 1022 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into computer system 1010 or onto computer network 1018.

User interface output devices 1020 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 1010 to the user or to another machine or computer system.

Storage subsystem 1024 stores the basic programming and data constructs that provide the functionality of certain embodiments of the present invention. For example, the various modules implementing the functionality of certain embodiments of the invention may be stored in storage subsystem 1024. These software modules are generally executed by processor 1014.

Memory subsystem 1026 typically includes a number of memories including a main random access memory (RAM) 1030 for storage of instructions and data during program execution and a read only memory (ROM) 1032 in which fixed instructions are stored. File storage subsystem 1028 provides persistent storage for program and data files, and may include a hard disk drive, a floppy disk drive along with associated removable media, a CD-ROM drive, an optical drive, or removable media cartridges. The databases and modules implementing the functionality of certain embodiments of the invention may be stored by file storage subsystem 1028.

Bus subsystem 1012 provides a mechanism for letting the various components and subsystems of computer system 1010 communicate with each other as intended. Although bus subsystem 1012 is shown schematically as a single bus, alternative embodiments of the bus subsystem may use multiple busses.

Computer readable medium 1040 can be a medium associated with file storage subsystem 1028, and/or with network interface 1016. The computer readable medium can be non-transitory and transitory media, such as a hard disk, a floppy disk, a CD-ROM, an optical medium, removable media cartridge, or electromagnetic wave. The computer readable medium 1040 is shown storing program instructions and/or data structures of the described technology.

Computer system 1010 itself can be of varying types including a personal computer, a portable computer, a workstation, a computer terminal, a network computer, a television, a mainframe, or any other data processing system or user device. Due to the ever-changing nature of computers and networks, the description of computer system 1010 depicted in FIG. 19 is intended only as a specific example for purposes of illustrating the preferred embodiments of the present invention. Many other configurations of computer system 1010 are possible having more or less components than the computer system depicted in FIG. 19.

This microprocessor is part of computer circuitry which includes a memory controller and an input-output controller. The microprocessor relies on the programmable logic device, because the outgoing test packets—which incorporate the test packet ingredients—are generated by the programmable logic device, rather than the microprocessor. The test packet ingredients generated by the microprocessor are stored at memory of the microprocessor, where the memory is coupled by a memory bus to this computer circuitry. The programmable logic device is coupled by a local bus to this computer circuitry.

A bus is a set of one or more lines used by an interface system to transfer data between devices. A local bus of a microprocessor supports addressing of the memory of the microprocessor, at memory addresses specified by a device attached to the local bus, such as a programmable logic device. A local bus supports reads and writes of memory addresses of such memory, and supports peer-to-peer communication between devices connected to the local bus. The memory bus, unlike a local bus, connects the memory to the computer circuitry, and communicates memory addresses and memory data, rather than supporting peer-to-peer communication of devices connected to the memory bus. The memory bus is specialized for the fast communication required by memory access with the CPU.

Examples of such buses above are PCI; PCI Express; HyperTransport; and InfiniBand.

A common example of a programmable logic device having integrated circuitry with configurably interconnected programmable logic is an FPGA, or field-programmable gate array. Such a programmable logic device does not generally include microprocessors, because microprocessors, although programmable, generally lack configurable interconnects among the internal logic components.

The controller circuits include a memory controller of the microprocessor, and an input/output controller of the microprocessor. The memory controller manages the flow of memory addresses and memory data over the memory bus with the memory of the microprocessor. The input/output controller connects and controls peripheral devices, particularly peripheral devices such as a programmable logic device connected to the local bus of the input/output controller.

The memory controller and the input/output controller are "of the microprocessor" if the memory controller and the input/output controller manage the flow of data with the microprocessor, respectively with the memory over the memory bus and with peripheral devices such as a programmable logic device over the local bus. The memory controller and the input/output controller can perform these functions, regardless of whether the memory controller and the input/output controller are integrated circuits physically separated from the microprocessor or are integrated in the same chip as the microprocessor. The memory is memory "of the microprocessor" if the memory serves the microprocessor via a memory controller of the microprocessor, regardless of whether the memory is physically separated from the microprocessor or is integrated in the same chip as the microprocessor. The memory is memory "of the programmable logic device" if the memory serves the programmable logic device via a memory controller of the programmable logic device, regardless of whether the memory is physically separated from the programmable logic device or is integrated in the same chip as the programmable logic device.

A "packet" is a formatted unit of information, designed to be transmitted and received as a single unit, of which a frame is an example.

The following discussion details several distinct aspects of the technology.

One aspect of the technology is a method of test packet generation for high packet volume tests that supports dynamic bandwidth sharing among multiple traffic classes with decreased memory requirements for queued test packets awaiting transmission.

One step of the method is ordering incomplete versions of the plurality of test packets distributed among a plurality of traffic class queues in a programmable logic device to determine an order of transmitting the plurality of test packets from the physical port, wherein the programmable logic device has configurable interconnections and a programmable logic device memory that is not large enough to hold complete versions of all of the plurality of test packets represented by the plurality of traffic class queues;

One step of the method is generating, with the programmable logic device, complete versions of the plurality of test packets from the incomplete versions of the plurality of test packets, and adding timestamps; and One step of the method is dispatching from the programmable logic device, the complete versions of the plurality of test packets via the physical port in the determined order according to the timestamps.

Another aspect of the invention is an apparatus for test packet generation for high packet volume tests that supports dynamic bandwidth sharing among multiple traffic classes with decreased memory requirements for queued test packets awaiting transmission.

The apparatus include a programmable logic device with a programmable logic device memory that is not large enough to hold complete versions of all of a plurality of test packets represented by a plurality of traffic class queues, wherein the programmable logic device is coupled to the microprocessor memory by at least a local bus;

The apparatus include a physical port dispatching complete versions of the plurality of test packets from the programmable logic device;

The apparatus include a programmable logic device module running on the programmable logic device with configurable interconnections that:

The programmable logic device module includes a step which orders incomplete versions of the plurality of test packets distributed among a plurality of traffic class queues to determine an order of transmitting the plurality of test packets from the physical port;

The programmable logic device module includes a step which generates, with the programmable logic device, complete versions of the plurality of test packets from the incomplete versions of the plurality of test packets, and adds timestamps; and The programmable logic device module includes a step which dispatches from the programmable logic device, the complete versions of the plurality of test packets via the physical port in the determined order according to the timestamps.

Another aspect of the invention is a non-transitory computer readable medium encoded with executable instructions for test packet generation for high packet volume tests that support dynamic bandwidth sharing among multiple traffic classes with decreased memory requirements for queued test packets awaiting transmission.

The medium has computer executable instructions for ordering, with a programmable logic device having configurable interconnections, incomplete versions of the plurality of test packets distributed among a plurality of traffic class queues in a programmable logic device to determine an order of transmitting the plurality of test packets from the physical port, wherein the programmable logic device has a programmable logic device memory that is not large enough to hold complete versions of all of the plurality of test packets represented by the plurality of traffic class queues;

The medium has computer executable instructions for generating, with the programmable logic device, complete versions of the plurality of test packets from the incomplete versions of the plurality of test packets, and adding timestamps; and The medium has computer executable instructions for dispatching, from the programmable logic device, the complete versions of the plurality of test packets via the physical port in the determined order according to the timestamps.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method of test packet generation for high packet volume tests that supports dynamic bandwidth sharing among multiple traffic classes with decreased memory requirements for queued test packets awaiting transmission, comprising:
   ordering incomplete versions of the plurality of test packets distributed among a plurality of traffic class queues in a programmable logic device having configurable interconnections to determine an order of transmitting the plurality of test packets from the physical port, wherein the programmable logic device has a programmable logic device memory that is not large enough to hold complete versions of all of the plurality of test packets represented by the plurality of traffic class queues;
   generating, with the programmable logic device, complete versions of the plurality of test packets from the incomplete versions of the plurality of test packets, and adding timestamps; and
   dispatching from the programmable logic device, the complete versions of the plurality of test packets via the physical port in the determined order according to the timestamps.

2. The method of claim 1, further comprising:
   generating, with a microprocessor, test packet ingredients and test packet recipes of the incomplete versions of a first subset of the plurality of test packets;
   retrieving the test packet ingredients and the test packet recipes of the first subset of the incomplete versions of the plurality of test packets, from a microprocessor memory of the microprocessor, via at least a local bus, into the programmable logic device memory of the programmable logic device;
   generating, with the programmable logic device, test packet ingredients and test packet recipes of the incomplete versions of a second subset of the plurality of test packets; and
   moving, at the programmable logic device, the incomplete versions of the first subset of the plurality of test packets and the incomplete versions of the second subset of the plurality of test packets into the plurality of traffic class queues.

3. The method of claim 1, wherein the plurality of traffic class queues have fronts from which the incomplete versions of the test packets are removed and backs to which the incomplete versions of the test packets are added, and the complete versions are generated from among the incomplete versions at the fronts of the plurality of traffic class queues.

4. The method of claim 1, wherein the incomplete versions of the plurality of test packets being ordered by the plurality of traffic class queues, include test packet ingredients and test packet recipes of the plurality of test packets.

5. The method of claim 1, wherein the plurality of traffic class queues represent queued test packets with queued records that include addresses in the programmable logic device memory of the programmable logic device which locate the incomplete versions of the queued packets.

6. The method of claim 1, wherein the plurality of traffic class queues represent queued test packets with queued records that include test packet lengths indicating lengths of complete versions of the plurality of test packets that are presently stored as incomplete versions in the programmable logic device memory of the programmable logic device.

7. The method of claim 1, wherein the plurality of traffic class queues represent queued test packets with queued records that include test packet lengths indicating lengths of incomplete versions of the plurality of test packets that are presently stored as incomplete versions in the programmable logic device memory of the programmable logic device.

8. The method of claim 1, wherein the plurality of traffic class queues comply with an Enhanced Transmission Selection standard of selecting a next test packet to transmit from among the plurality of test packets distributed among the plurality of traffic class queues.

9. The method of claim 1, further comprising:
   generating, with a microprocessor, test packet ingredients and test packet recipes of the incomplete versions of the plurality of test packets;
   retrieving the test packet ingredients and the test packet recipes of the incomplete versions of the plurality of test packets, from a microprocessor memory of the microprocessor, via at least a local bus, into the programmable logic device memory of the programmable logic device; and
   moving, at the programmable logic device, the incomplete versions of the plurality of test packets into the plurality of traffic class queues.

10. The method of claim 1, further comprising:
    generating, with the programmable logic device, test packet ingredients and test packet recipes of the incomplete versions of the plurality of test packets; and
    moving, at the programmable logic device, the incomplete versions of the plurality of test packets into the plurality of traffic class queues.

11. An apparatus for test packet generation for high packet volume tests that supports dynamic bandwidth sharing among multiple traffic classes with decreased memory requirements for queued test packets awaiting transmission, including:
    a programmable logic device with a programmable logic device memory that is not large enough to hold complete versions of all of a plurality of test packets represented by a plurality of traffic class queues, wherein the programmable logic device is coupled to the microprocessor memory by at least a local bus;
    a physical port dispatching complete versions of the plurality of test packets from the programmable logic device;
    a programmable logic device module running on the programmable logic device with configurable interconnections that:
       orders incomplete versions of the plurality of test packets distributed among a plurality of traffic class queues to determine an order of transmitting the plurality of test packets from the physical port;
       generates, with the programmable logic device, complete versions of the plurality of test packets from the incomplete versions of the plurality of test packets, and adds timestamps; and
       dispatches from the programmable logic device, the complete versions of the plurality of test packets via the physical port in the determined order according to the timestamps.

12. The apparatus of claim 11, further comprising:
    a microprocessor with a microprocessor memory; and
    a microprocessor module running on the microprocessor that:
       generates, with the microprocessor, test packet ingredients and test packet recipes of the incomplete versions of a first subset of the plurality of test packets; and wherein the programmable logic device running on the programmable logic device performs:

retrieves the test packet ingredients and the test packet recipes of the first subset of the incomplete versions of the plurality of test packets, from a microprocessor memory of the microprocessor, via at least a local bus, into the programmable logic device memory of the programmable logic device;

generates, with the programmable logic device, test packet ingredients and test packet recipes of the incomplete versions of a second subset of the plurality of test packets; and moves, at the programmable logic device, the incomplete versions of the first subset of the plurality of test packets and the incomplete versions of the second subset of the plurality of test packets into the plurality of traffic class queues.

13. The apparatus of claim 11, wherein the plurality of traffic class queues have fronts from which the incomplete versions of the test packets are removed and backs to which the incomplete versions of the test packets are added, and the complete versions are generated from among the incomplete versions at the fronts of the plurality of traffic class queues.

14. The apparatus of claim 11, wherein the incomplete versions of the plurality of test packets being ordered by the plurality of traffic class queues, include test packet ingredients and test packet recipes of the plurality of test packets.

15. The apparatus of claim 11, wherein the plurality of traffic class queues represent queued test packets with queued records that include addresses in the programmable logic device memory of the programmable logic device which locate the incomplete versions of the queued packets.

16. The apparatus of claim 11, wherein the plurality of traffic class queues represent queued test packets with queued records that include test packet lengths indicating lengths of complete versions of the plurality of test packets that are presently stored as incomplete versions in the programmable logic device memory of the programmable logic device.

17. The apparatus of claim 11, wherein the plurality of traffic class queues represent queued test packets with queued records that include test packet lengths indicating lengths of incomplete versions of the plurality of test packets that are presently stored as incomplete versions in the programmable logic device memory of the programmable logic device.

18. The apparatus of claim 11, wherein
the plurality of traffic class queues comply with an Enhanced Transmission Selection standard of selecting a next test packet to transmit from among the plurality of test packets distributed among the plurality of traffic class queues.

19. The apparatus of claim 11, further comprising:
a microprocessor with a microprocessor memory; and
a microprocessor module running on the microprocessor that:

generates, with the microprocessor, test packet ingredients and test packet recipes of the incomplete versions of the plurality of test packets; and wherein the programmable logic device running on the programmable logic device performs:

retrieves the test packet ingredients and the test packet recipes of the incomplete versions of the plurality of test packets, from the microprocessor memory of the microprocessor, via at least a local bus, into the programmable logic device memory of the programmable logic device; and moves, at the programmable logic device, the incomplete versions of the plurality of test packets into the plurality of traffic class queues.

20. The apparatus of claim 11, wherein the programmable logic device running on the programmable logic device performs:

generates, with the programmable logic device, test packet ingredients and test packet recipes of the incomplete versions of the plurality of test packets; and moving, at the programmable logic device, the incomplete versions of the plurality of test packets into the plurality of traffic class queues.

21. A non-transitory computer readable medium encoded with executable instructions for test packet generation for high packet volume tests that support dynamic bandwidth sharing among multiple traffic classes with decreased memory requirements for queued test packets awaiting transmission, comprising:

computer executable instructions for ordering, with a programmable logic device having configurable interconnections, incomplete versions of the plurality of test packets distributed among a plurality of traffic class queues in a programmable logic device to determine an order of transmitting the plurality of test packets from the physical port, wherein the programmable logic device has a programmable logic device memory that is not large enough to hold complete versions of all of the plurality of test packets represented by the plurality of traffic class queues;

computer executable instructions for generating, with the programmable logic device, complete versions of the plurality of test packets from the incomplete versions of the plurality of test packets, and adding timestamps; and computer executable instructions for dispatching, from the programmable logic device, the complete versions of the plurality of test packets via the physical port in the determined order according to the timestamps.

* * * * *